United States Patent [19]
Deubel et al.

[11] 3,960,591
[45] June 1, 1976

[54] PROCESS FOR THE PREPARATION OF PIGMENT COMPOSITIONS FOR THE DOPE DYEING OF POLYACRYLONITRILE

[75] Inventors: Reinhold Deubel, Altenhain, Taunus; Volker Hemmerling, Kelkheim, Taunus; Werner Reitz, Frankfurt am Main; Wolfgang Teige, Kelkheim, Taunus, all of Germany

[73] Assignee: Hoechst Aktiengesellschaft, Frankfurt am Main, Germany

[22] Filed: Feb. 13, 1974

[21] Appl. No.: 441,936

Related U.S. Application Data

[63] Continuation of Ser. No. 292,416, Sept. 26, 1972, abandoned.

[30] Foreign Application Priority Data

Sept. 28, 1971   Germany............................ 2148347

[52] U.S. Cl. ............................ 106/308 M; 106/309; 260/29.6 AN; 260/29.6 AB; 260/42.21; 260/42.48; 260/42.55
[51] Int. Cl.² ............................................ C09C 3/10
[58] Field of Search ............. 260/31 N, 41 B, 41 C, 260/42.21, 42.48, 42.55, 29.6 AN, 29.6 AB; 106/308 M, 309; 117/100 MB

[56] References Cited
UNITED STATES PATENTS

| | | | |
|---|---|---|---|
| 2,309,522 | 1/1943 | Marks | 260/42.52 |
| 2,480,821 | 9/1949 | Connell | 260/42.55 |
| 3,190,850 | 3/1965 | Burke | 260/41 X |
| 3,194,862 | 7/1965 | Coover | 264/306 |
| 3,361,705 | 12/1967 | Kay | 260/41 X |
| 3,632,699 | 1/1972 | Wilson | 264/38 |

*Primary Examiner*—James H. Derrington
*Attorney, Agent, or Firm*—Curtis, Morris & Safford

[57] ABSTRACT

A pigment composition for the dyeing of polyacrylonitrile polymers and copolymers prepared by adding a polyacrylonitrile polymer or copolymer as a support in the preparation of formation of the pigment and working up the pigment in usual manner.

As support material there are suitable as well pure polyacrylonitrile as copolymers containing, in addition to acrylonitrile, one or more other copolymerizable monoolefinic monomers.

The amount of support material to be added ranges from 20 to 80, preferably from 30 to 60% by weight, calculated on the finished composition. As pigments there may be used those which are prepared or formed in purely aqueous systems or in aqueous systems containing organic solvents, for example azo pigments or pigments of perylene tetracarboxylic acid or naphthalene tetracarboxylic acid, dioxazines, phthalocyanines, quinacridones, indigoids, anthraquinone dyestuffs, iron oxide and titanium dioxide.

The pulverulent compositions thus obtained are especially suitable for the dyeing of spinning solutions of polyacrylonitrile fibers and the modifications thereof. They may be dispersed by simply stirring them into an appropriate spinning solvent.

2 Claims, No Drawings

PROCESS FOR THE PREPARATION OF PIGMENT COMPOSITIONS FOR THE DOPE DYEING OF POLYACRYLONITRILE

This application is a continuation of co-pending application Ser. No. 292,416, filed Sept. 26, 1972 now abandoned.

The present invention relates to a process for the preparation of pigment compositions which are suitable for the dyeing of polyacrylonitrile spinning solutions.

It has been known for a long time to dye polyacrylonitrile fibers with basic dyestuffs from aqueous solutions. However, owing to the better fastness properties of the pigments and the more rational and inexpensive working methods, the use of pigments is gaining more and more importance in the dope dyeing. For this, it is necessary to have the pigments very finely dispersed in the spinning solution so as to achieve an optimum tinctorial strength and levelness of the dyeing and to avoid operational troubles, such as clogged filters or spinning nozzles and broken filaments due to coarse agglomerates. German Pat. No. 1,225,858 discloses a process, wherein pigments are ground with polyvinyl acetate or a copolymer predominantly consisting of polyvinyl acetate or a mixture of polymers in a divided trough kneader or in an attritor mill and then the mixture is added to the spinning solutions.

However, polyvinyl acetate used for stabilizing the pigment dispersion and intended to prevent reagglomeration of the pigment may alter the physical properties of the fibrous material.

The patent of the German Democratic Republic No. 62,443 discloses a process for the preparation of pigment compositions, which do not contain substances affecting the properties of the fiber. There, the pigment compositions are obtained by separately or jointly grinding the pigment and the polymer in an aqueous medium in a bead mill and subsequently separating them jointly.

Another possibility of preparing pulverulent pigment compositions having the desired properties is kneading the pigment with a high-viscosity paste made from polymer and solvent and then removing the solvent by vaporization.

For immediate use, the pigment dispersions may also be prepared by grinding the pigment in a bead mill in the corresponding spinning solvent and stabilizing the dispersion with a polymer solution.

All the cited methods for preparing pigment compositions or finely dispersing pigments for use in the dyeing of polyacrylonitrile spinning solutions have the disadvantage of being very expensive in industry owing to the use of grinding and kneading devices.

The present invention now provides a process for the preparation of pigment compositions for the dyeing of spinning solutions of polyacrylonitrile and the modifications thereof, which comprises adding polyacrylonitrile polymers or copolymers, produced by the dispersion polymerization process, as a support in the preparation or formation of the pigments and working up the pigments in usual manner.

Such pigment compositions are prepared by stirring the pigments with the required amount of the polyacrylonitrile polymer of copolymer for the preparation or formation and working up the pigment thus treated in usual manner. The polyacrylonitrile polymer or copolymer is advantageously used in the form of its moist filter cake as obtained upon dispersion polymerization.

For this purpose, it is not necessary to bring the filter cake by dispersing, for example grinding in a bead mill, into a dispersion, the particle size of which corresponds to the pigment fineness. Where required, an additional use of slight amounts of a surface-active agent proves advantageous for obtaining optimum pigment compositions. As such agents, there may be mentioned as well non ionic oxalkylated alkyl phenols or fatty alcohols as special cationic or anionic adjuvants. A number of pigments which already require surfactants for their preparation or formation need no further addition of surface-active adjuvants to the composition.

As support material there are suitable as well pure polyacrylonitrile as copolymers containing, in addition to acrylonitrile, one or more other copolymerizable monoolefinic monomers. Suitable copolymerizable monoolefinic compounds are, for example, disclosed in German Auslegeschrift No. 1,292,310.

The amount of support material to be added ranges from 20 to 80, preferably from 30 to 60% by weight, calculated on the finished composition.

The moment of making the composition is different with the individual pigments, since it depends on the type of preparation or formation. Azo pigments are made into a composition by adding the aqueous filter cake of polyacrylonitrile prior or after coupling. To pigments which are formed by heating them at temperatures of up to 100°C and/or more after coupling is complete, polyacrylonitrile may also be added prior or after heating. An additional use of surface-active adjuvants is not required in this case. The composition is separated, as in the preparation of the pure pigment, by suction-filtration, washing and drying and subsequent grinding. Pigments which are ground together with a salt to achieve fine division are made into a composition by preparing a mixture of water, the required polyacrylonitrile filter cake and a small amount of a surface-active adjuvant and introducing the pigment - salt mixture therein while stirring. The salt is suitably extracted at an elevated temperature (60°– 80°C). The composition is worked up in a manner analogous to that disclosed for azo pigment compositions.

In the case of pigments of naphthalene-tetracarboxylic acid, dioxazine, quinacridone or phthalocyanine, the composition is also made in the course of preparation or formation, for example in the formation of the pigment grain or the desired crystalline modification by heating in an aqueous or solvent-containing system or in the hydrolysis of salts or salt-like addition compounds, as well as in the precipitation and dissolution of the pigments.

In this manner, compositions having a content of from 20 to 80, preferably from 40 to 70%, of pigment are obtained.

The present process is suitable for making compositions of inorganic or organic pigments which are prepared or formed in purely aqueous systems or in aqueous systems containing organic solvents, for example azo pigments or pigments of perylene tetracarboxylic acid or naphthalene tetracarboxylic acid, dioxazines, phthalocyanines, quinacridones, indigoids, anthraquinone dyestuffs, iron oxide and titanium dioxide.

The pulverulent compositions of the invention are especially suitable for the dyeing of spinning solutions of polyacrylonitrile fibers and the modifications thereof. They may be dispersed by simply stirring them into an appropriate spinning solvent, for example dimethylformamide, dimethyl-sulfoxide, dimethylacetamide or an aqueous sodium rhodanide solution, the pigment particle size in the suspension obtained being from 0.02 to 2 $\mu$m. The advantage of the present process as compared to already known methods resides in the fact that the primary grain of the pigment obtained upon preparation or formation is protected and preserved in the composition, whilst the pigment agglomerates obtained by isolation and drying according to the above-mentioned methods have to be broken up again by complicated methods. According to this invention, pigment and composition are thus prepared in one working step without additional apparatus expenditure being required.

The following Examples serve to illustrate the invention, the parts and percentages being by weight unless stated otherwise.

EXAMPLE 1:

101.2 Parts of 3,3'-dichloro-4,4'-diamino-diphenyl were stirred with about 250 parts of water and 195 parts of hydrochloric acid (37%) and the mixture was diazotized with 138 parts of a sodium nitrite solution (40%) at 0° – 10°C. 240 Parts of 2,5-dimethoxy-4-chloroacetoacetyl anilide were dissolved at 25°C in 800 parts of water and 109.2 parts of sodium hydroxide solution (33%) and the solution was combined while stirring at 5° – 14°C with a mixture of 1000 parts of water, 684 parts of glacial acetic acid and 4 parts of a stearyl alcohol that had been oxethylated with 20 mols of ethylene oxide. To this suspension of the coupling component, a solution of diazotized 3,3'-dichloro-4,4'-diamino-diphenyl and then 618 parts of an aqueous filter cake (36.7%) of polyacrylontrile were added slowly, the filter cake being obtained according to the dispersion polymerization process (hereinafter referred to as PAC filter cake). The mixture was stirred for 1 hour at room temperature and then heated to 85°C. After heating for 15 minutes at 85°C, the mixture was filtered, the residue was washed with water and dried at 60°C. In this manner, 567 parts of a yellow pigment composition having a pigment content of 60% were obtained, which could be dispersed by simply stirring it into the spinning solvent. By incorporating the dispersion in the spinning solution and subsequently molding the solution into filaments, brilliant dyeings were obtained which had a high transparency and a good fastness to rubbing.

Similar good products were obtained by introducing the PAC filter cake, prior to the precipitation of the coupling component, into the mixture of water, glacial acetic acid and emulsifier or adding it, after precipitation, to the suspension of 2,5-dimethoxy-4-chloroacetoacetyl anilide and effecting the coupling reaction.

EXAMPLE 2:

40.8 Parts of 4-amino-benzamide were dissolved in 1600 parts of water and 88.5 parts of hydrochloric acid (37%) and the solution was diazotized at 12°C with 52 parts of a sodium nitrite solution (40%). To the diazonium salt solution, 6 parts of glacial acetic acid, 13.6 parts of crystallized sodium acetate and 3 parts of a stearyl alcohol oxethylated with 20 mols of ethylene oxide were added. 99 Parts of 2-hydroxynaphthoic acid-o-phenetidide were dissolved in 2800 parts of water and 73.5 parts of a sodium hydroxide solution (33%) and the solution was united at 13°–15°C with the diazonium salt solution. When the coupling reaction was complete, 272 parts of a PAC filter cake (36%) were added, the mixture was stirred for 1 hour at room temperature and the suspension was heated to 98°C. After heating for 1 – 2 hours at 98°C, the suspension was suction-filtered, the residue was washed with water and dried at 60°C. 240 Parts of a composition having a pigment content of 60% and excellent dispersing properties were obtained.

EXAMPLE 3:

50.4 Parts of 5-nitro-2-amino-anisole were stirred with 1200 parts of water and 118 parts of hydrochloric acid (37%) and the mixture was diazotized at 0° – 10°C with 51.8 parts of a sodium nitrite solution (40%).

105.3 Parts of 5-(2'-hydroxy-3-naphthoylamino)-benzimidazolone were dissolved in 500 parts of water while adding 109 parts of a sodium hydroxide solution (33%) and united, while stirring at 5°C, together with the diazonium salt solution, with a mixture of 2700 parts of water, 146.4 parts of a sodium hydroxide solution (33%), 90 parts of glacial acetic acid and 18 parts of a 10% aqueous emulsion of a concentrate consisting of 25 parts of a sodium salt of alkyl-sulfamido-acetic acid obtained by semi-sulfochlorination of a hydrocarbon fraction boiling between 180° and 330°C, and of 75 parts of mineral oil. After the coupling reaction was complete, the pH-value was adjusted to weakly acid by means of dilute sodiumhydroxide solution and the suspension was heated to 130°C for 3 to 4 hours in an autoclave. After cooling to 80°C, 291 parts of a 37.5% PAC filter cake were introduced while stirring, and stirring was continued for 1 hour at 80°C. The mixture was suction-filtered, the residue was washed with water and dried at 60°C. 280 parts of a 60% pigment composition were obtained, which could be dispersed by simply stirring it in the spinning solvent.

EXAMPLE 4:

In a vessel provided with a stirrer, 408 parts of a 36.7% PAC filter cake were suspended in 1600 parts of water and 3 parts of sodium naphthenate and, while stirring, 937.5 parts of a mixture which had been ground in a roller or vibratory mill and which consisted of 16% of perylene-(3,4,9,10)-tetracarboxylic acid-bis-(3',5'-dimethyl-anilide) and 84% of sodium sulfate were introduced. The mixture was then heated to 80°C and stirring was continued for about 30 minutes. The mixture was suction-filtered and washed with about 10,000 parts of water of 80°C until free from salt. The filter cake obtained was dried at 60°C in a circulating air cabinet and ground in a primed disk mill. The powder obtained contained 50% of pigment and could easily and entirely be dispersed in an appropriate spinning solvent by simply stirring it with a dissolver.

EXAMPLE 5:

When the ground mixture of pigment and salt of Example 4 was replaced by a mixture of 4,4'-7,7'-tetrachloro-orthoindigo correspondingly ground with sodium sulfate, while operating as in Example 4, a pigment composition having similar good technological properties was obtained.

EXAMPLE 6:

160 Parts of a 37.5% PAC filter cake and 6 parts of a nonylphenol oxethylated with 15 mols of ethylene oxide were stirred in about 3000 parts of water. 359

Parts of a potassium addition compound moist with ethanol of 8,17-dioxo-bis-benzimido(2,1-b:2',1'-i)benzo (1mn)-(3,8)-phenanthroline (C.I. Vat Orange 7, No. 71 105) having a pigment content of 39%, were introduced into the suspension, the potassium addition compound hydrolizing to yield the pigment. The pH-value was then adjusted to 8 by means of 5N HCl and the mixture was then stirred for about 30 minutes at a temperature of 60°C. The mixture was suction-filtered, washed to neutral and dried at 60°C in a circulating air cabinet. By grinding in a primed disk mill a pulverulent pigment composition having a pigment content of 60% was obtained.

We claim:

1. A process for the preparation or formation of pigment compositions consisting of 20 to 80% of a pigment and 80 to 20% of a polyacrylonitrile polymer or copolymer wherein a suspension of solid polymer or copolymer in water is added to an aqueous mixture containing a pigment, said mixture having been formed in the process of preparing or forming said pigment, prior to any recovery of the pigment from said aqueous mixture; and thereafter the preparation or formation of the pigment is completed.

2. A process as recited in claim 1 wherein the suspension of solid polymer or copolymer is a wet filter cake.

* * * * *